United States Patent
Schnetter et al.

(10) Patent No.: US 11,492,822 B2
(45) Date of Patent: Nov. 8, 2022

(54) DOOR HANDLE UNIT (71) Applicant: Brose Fahrzeugteile GmbH & Co. Kommanditgesellschaft, Bamberg, Bamberg (DE)

(72) Inventors: Sebastian Schnetter, Reckendorf (DE); Bert Almes, Leuna (DE); Rolf Buecker, Bamberg (DE); Lukas Rudnik, Moringen (DE)

(73) Assignee: Brose Fahrzeugteile GmbH SE & Co. Kommanditgesellschaft, Bamberg, Bamberg (DE)

( * ) Notice: Subject to any disclaimer, the term of this patent is extended or adjusted under 35 U.S.C. 154(b) by 1006 days.

(21) Appl. No.: 16/213,206

(22) Filed: Dec. 7, 2018

(65) Prior Publication Data
US 2019/0178000 A1 Jun. 13, 2019

(30) Foreign Application Priority Data
Dec. 11, 2017 (DE) ...................... 10 2017 129 431.7

(51) Int. Cl.
*E05B 79/06* (2014.01)
*E05B 85/10* (2014.01)
(Continued)

(52) U.S. Cl.
CPC .................. *E05B 79/06* (2013.01); *B60J 5/00* (2013.01); *B60J 5/0468* (2013.01); *E05B 81/00* (2013.01);
(Continued)

(58) Field of Classification Search
CPC .......... E05B 79/06; E05B 81/00; E05B 81/04; E05B 85/103; E05B 85/107; E05B 85/10;
(Continued)

(56) References Cited

U.S. PATENT DOCUMENTS 8,919,047 B2 * 12/2014 Johnsrud ............... E05B 85/103
292/336.3
8,985,648 B2 * 3/2015 Muller .................. E05B 85/107
292/DIG. 31
(Continued)

FOREIGN PATENT DOCUMENTS

DE     29520716    3/1996
DE     19950172    4/2001
(Continued)

OTHER PUBLICATIONS

"Search Report," for German Patent Application No. 102017129431.7 (priority application to U.S. Appl. No. 16/213,206) dated Jul. 24, 2018 (10 pages), no translation available.

*Primary Examiner* — William L Miller
(74) *Attorney, Agent, or Firm* — Pauly, DeVries Smith & Deffner LLC (57) ABSTRACT

The disclosure relates to a door handle for a vehicle door which can be installed as such from the door inner side on a handle recess of the outer skin of the vehicle door, wherein the handle unit has a handle module and an especially elongate handle part which is accommodated by the handle module, wherein the handle module has a mechanism for the motorized adjustment of the handle part, wherein the handle unit can be pre-installed on the door. The door handle unit can have a fastening slide which, with the handle unit pre-installed is connected to the handle module on one side and to the motor vehicle door on the other side, wherein for the final installation of the door handle unit an installation movement can be introduced into the fastening slide by a tool in an installation direction from a narrow side of the vehicle door.

20 Claims, 5 Drawing Sheets (51) Int. Cl.
  *E05B 81/00* (2014.01)
  *B60J 5/04* (2006.01)
  *B60J 5/00* (2006.01)

(52) U.S. Cl.
  CPC .......... *E05B 85/103* (2013.01); *E05B 85/107* (2013.01); *B60J 5/0416* (2013.01); *Y10T 16/473* (2015.01)

(58) Field of Classification Search
  CPC .. E05B 85/12; B60J 5/00; B60J 5/0468; B60J 5/0416; B60J 5/04; B60J 5/0415; Y10T 16/473
  USPC .......... 16/429; 296/1.02; 292/336.3
  See application file for complete search history.

(56) References Cited

U.S. PATENT DOCUMENTS

| | | | | |
|---|---|---|---|---|
| 9,103,143 | B2* | 8/2015 | Wheeler | G02B 6/00 |
| 10,533,353 | B2* | 1/2020 | Smart | E05B 81/76 |
| 10,655,371 | B2* | 5/2020 | Soonthornwinate | E05B 77/06 |
| 10,738,513 | B2* | 8/2020 | Soonthornwinate | E05B 85/103 |
| 11,078,691 | B2* | 8/2021 | Salter | B60R 25/23 |
| 11,131,128 | B2* | 9/2021 | Porada | E05B 85/103 |
| 11,214,994 | B2* | 1/2022 | Han | E05B 85/103 |
| 2011/0148575 | A1 | 6/2011 | Sobecki et al. | |
| 2012/0247161 | A1* | 10/2012 | Muller | E05B 85/107 70/91 |
| 2014/0327252 | A1* | 11/2014 | Sobecki | E05B 81/34 292/336.3 |
| 2015/0315826 | A1* | 11/2015 | Lang | E05B 85/103 49/503 |
| 2018/0163442 | A1* | 6/2018 | Soonthornwinate | E05B 77/06 |
| 2019/0003216 | A1* | 1/2019 | Wilke | E05B 79/06 |
| 2019/0078358 | A1* | 3/2019 | Heyduck | E05B 79/04 |
| 2019/0112845 | A1* | 4/2019 | Porada | E05B 85/107 |
| 2019/0234122 | A1* | 8/2019 | Löw | E05B 85/103 |
| 2021/0002928 | A1* | 1/2021 | Toyama | E05B 81/56 |
| 2021/0156179 | A1* | 5/2021 | Savant | E05B 85/107 |
| 2021/0172218 | A1* | 6/2021 | Velicanin | E05B 79/20 |
| 2021/0189778 | A1* | 6/2021 | Sha | E05B 81/76 |
| 2021/0363794 | A1* | 11/2021 | Rhein | E05B 81/90 |
| 2021/0363795 | A1* | 11/2021 | Toyama | E05B 85/107 |
| 2021/0381287 | A1* | 12/2021 | Guerin | E05B 85/16 |
| 2022/0018167 | A1* | 1/2022 | Rocci | E05B 85/103 |
| 2022/0042356 | A1* | 2/2022 | Herdering | E05B 85/107 |

FOREIGN PATENT DOCUMENTS

| | | |
|---|---|---|
| DE | 102004001894 | 8/2005 |
| EP | 1427905 | 8/2005 |

* cited by examiner

DOOR HANDLE UNIT

CLAIM OF PRIORITY

This application claims the benefit of German Patent Application No. DE 10 2017 129 431.7 filed on Dec. 11, 2017, the disclosure of which is incorporated herein by reference.

FIELD OF THE TECHNOLOGY

The disclosure relates to a door handle unit for a motor vehicle door, to an installation module for a motor vehicle door having such a door handle unit, to a motor vehicle door having such a door handle unit, and to a method for installing such a door handle unit on a motor vehicle door.

BACKGROUND

A door handle unit in question has to meet a multiplicity of demands today which are at least in part in conflict with each other. One requirement is that the handle part enables an operation of the motor vehicle door which is as comfortable as possible from the haptic point of view. Another requirement, on the other hand, is that the door handle unit overall is to impair the styling of the motor vehicle as little as possible. This has led to adjustable handle parts being used especially in the case of luxury class vehicles.

The known door handle unit (US 2011/0148575 A1), on which the disclosure is based, allows adjustment of the handle part between a parking position, in which the handle part terminates flush with the door outer skin, and an operating position, in which the handle part projects from the door outer skin and in this respect can be easily gripped by a hand of the user. To this end, the door handle unit is equipped with a handle module which provides a mechanism for the motorized adjustment of the handle part.

In order to achieve the flush termination of the handle module in the parking position with the door outer skin of the motor vehicle door, the door handle unit is to be installed as such from the door inner side on a handle recess of the door outer skin. A fastening possibility from the door outer side, such as in the region of the grip shell of older door handle units, does not as a rule exist.

The known door handle unit is therefore fixed on the door outer skin or on a door structure which is associated with door outer skin from the door inner side using screw elements, which is relatively costly. Added to this is the fact that an efficient installation when using door modules with the known door handle unit is barely possible. Such a door module, which in addition to the door handle unit can accommodate a motor vehicle lock, a window guiderail or the like, and allows a simultaneous installation of all these functional components, specifically customarily closes off the opening in the wet-dry space partition of the motor vehicle door through which the door handle unit would be accessible for its fastening. In this respect, the efficient per se use of door modules has to be dispensed when installing the known door handle unit.

SUMMARY

The disclosure is based on the problem of designing and developing the known door handle unit in such a way that efficiency in the production of the associated motor vehicle door is increased.

The above problem is solved in the case of a door handle unit according to embodiments disclosed herein.

In detail, the door handle unit has a fastening slide which, with the door handle unit pre-installed, is connected to the handle module on one side and to the motor vehicle door on the other side. In the course of the pre-installation, a pre-positioning of the door handle unit on the motor vehicle door takes place, which constitutes the prerequisite for the subsequent final installation.

For the final installation of the door handle unit, it is proposed that an installation movement in an installation direction can be introduced into the fastening slide from a narrow side of the motor vehicle door by means of a tool. In this case, it is essential that the fastening slide has at least one engagement element which is designed to interact with a mating engagement element in the course of the final installation and from the installation movement to create a clamping of the handle module by the door outer skin or by a door structural element which is associated with the door outer skin.

The clamping force which is associated with the clamping according to the proposal can act transversely to the installation direction.

With a suitable design, the complete fastening of the door handle unit on the motor vehicle door can be carried out from the narrow side of the motor vehicle door. In the case of the narrow side it can be the end face of the motor vehicle door on which the motor vehicle lock is arranged. In the case of a hinged motor vehicle door, this is the end face which is arranged opposite the door hinge.

By means of the fastening according to the proposal of the door handle unit, the door handle unit can be efficiently pre-installed and then finally installed in or on the motor vehicle door via an installation module, especially a door module or a lock module. The fastening from the narrow side of the motor vehicle door can easily be implemented with an installation module which is fitted in or on the motor vehicle door. In this way, it is also possible to test the entire installation module as a sub-assembly before installation on the motor vehicle door, which is regularly associated with an increase in quality during the production of the motor vehicle door.

The solution according to the proposal is also advantageous with regard to the resulting utilization of installation space. This especially lies in the fact that the installation space between the door handle unit and the narrow side of the motor vehicle door, which is relevant here, remains for the most part un-utilized so that using this installation space for the operation of the fastening slide is particularly appropriate.

By means of the solution according to the proposal, the fastening of the door handle unit can be realized entirely by the operation of a single fastening slide. To this end, it is provided in some embodiments that provision is made for at least two spaced apart engagement elements. The spacing of the engagement elements ensures that the clamping according to the proposal of the handle module is carried out at different points of the handle module, and therefore, with a suitable design, via the handle module at the same time.

In some embodiments, the fastening slide is designed as a dimensionally stable component. This means that the installation movement extends directly to all the engagement elements without any gear or transmission elements being required. This leads to a particularly simple adaptation to implementation of the solution according to the proposal.

Some embodiments for the pre-installation of the door handle unit are described herein. It is essential in this case that by means of the pre-installation a pre-positioning of the door handle unit on the motor vehicle door is realized. This in turn allows a final installation according to the proposal of the door handle unit as a result of an operation of the fastening slide.

A particularly convenient creation of the installation movement which is to be introduced into the fastening slide is described herein. The feed device there, in an advantageous variant of a simple screw element, serves for creating the installation movement, which can be implemented not only in a constructionally simple manner but also guarantees a good retention effect.

Various embodiments relate to the creation of a deflection mechanism via the interaction of engagement element and mating engagement element. The deflection mechanism, as a reaction to the installation movement, depending on embodiment, introduces a feed movement into the fastening slide and/or into the handle module which is directed toward the door outer skin. It is shown here that the basic principle of the solution according to the proposal can be implemented in quite different constructional ways.

A boundary condition which is proposed for an easy pre-installation and/or final installation of the door handle unit exists in accordance with various embodiments in the fact that for the pre-installation and/or for the final installation engagement element and mating engagement element sink into each other as a pair. With a suitable design, a simple "threading in" of the door handle unit on the motor vehicle door can be realized here.

A solution especially for realizing a sealing engagement between the handle module and the handle recess of the door outer skin is described herein, according to which the handle module is supported on the door outer skin or on a door structural element which is associated with the door outer skin from the door inner side. The interposition of a possibly provided seal is possible here without any problem. The counter support can be undertaken by the fastening slide which also acts upon the door outer skin or on a door structural element which is associated with the door outer skin, this time, however, toward the door inner side.

In various embodiments, the at least one mating engagement element is arranged on a component fixed to the door. In this way, a particularly simple implementation of the solution according to the proposal can be realized, for example by the fastening slide being formed by the handle module. The structurally clear construction is "bought" by the handle module together with the fastening slide at the same time fulfilling movement proportions in the installation direction and in the feed direction.

A movement of the handle module is created exclusively in the feed direction in accordance with various embodiments, which can improve possible interaction of the handle module with an interposed seal.

In principle, however, it can also be provided, that the mating engagement element is arranged on the handle module so that for the clamping according to the proposal a separate supporting of the fastening slide on the motor vehicle door is required. This is realized in accordance with various embodiments by means of a corresponding longitudinal guiding of the fastening slide on the door outer skin or on a door structural element which is associated with the door outer skin. The longitudinal guiding of the fastening slide can be realized for example by the fastening slide being hooked into the handle recess of the door outer skin in the course of the pre-installation of the door handle unit.

According to a further teaching, an installation module for a motor vehicle door is described as such.

The installation module according to the proposal has an installation module carrier on which are fastened at least two functional components. The installation module can be mounted in or on the motor vehicle door together with the functional components. According to the proposal, the fact is that one of the functional components is designed as a door handle unit according to the proposal. Reference may be made to all the explanations which relate to the door handle unit.

The door handle unit according to the proposal can be used in a particularly advantageous manner in conjunction with an installation module as described which in the state fitted in or on the motor vehicle door blocks access to the door handle unit. This blocking, however, is not a problem according to the proposal since the final installation of the door handle unit is of course possible from the narrow side of the motor vehicle door.

According to a further teaching, a motor vehicle door with a door handle unit according to the proposal and/or an installation module according to the proposal is described as such. Reference may also be made in this respect to all the embodiments which relate to the door handle unit according to the proposal and also relate to the installation module according to the proposal.

According to a further teaching, a method for installing a door handle unit according to the proposal on a motor vehicle door is described as such.

Generally speaking, it is essential that the door handle unit is pre-installed from the door inner side and is then finally installed as a result of the fastening movement of the fastening slide. Reference may also be made in this respect to all the embodiments which relate to the door handle unit according to the proposal and to the installation module according to the proposal.

Particularly worthy of note, with regard to the installation module according to the proposal, is also the use of an installation module which, as mentioned above, blocks the access to the door handle unit. In light of the final installation according to the proposal via the narrow side of the motor vehicle door, this again is not a problem.

Various embodiments provide a door handle unit for a motor vehicle door which can be installed as such from the door inner side on a handle recess of the door outer skin of the motor vehicle door, especially in a flush or set back manner in relation to the door outer skin, wherein the door handle unit has a handle module and an especially elongate handle part which is accommodated by the handle module, wherein the handle module has a mechanism for the motorized adjustment of the handle part, wherein the door handle unit can be pre-installed on the motor vehicle door, wherein, the door handle unit has a fastening slide which, with the door handle unit pre-installed, is connected to the handle module on one side and to the motor vehicle door on the other side, in that for the final installation of the door handle unit an installation movement can be introduced into the fastening slide by means of a tool in an installation direction from a narrow side of the motor vehicle door, in that the fastening slide has at least one engagement element which is designed to interact with a mating engagement element in the course of the final installation and from the installation movement to create a clamping of the handle module by the door outer skin or a door structural element which is associated with the door outer skin.

In various embodiments, the fastening slide has at least two separate engagement elements which are spaced apart with regard to the installation direction and which are designed to interact with mating engagement elements in the course of the final installation and from the installation movement to create a clamping of the handle module by the door outer skin or a door structural element which is associated with the door outer skin.

In various embodiments, the fastening slide has at least two separate engagement elements which are spaced apart with regard to a transverse direction which is oriented transversely to the installation direction and which are designed to interact with mating engagement elements in the course of the final installation and from the installation movement to create a clamping of the handle module by the door outer skin or a door structural element which is associated with the door outer skin, such as in that the fastening slide has at least four engagement elements which are oppositely arranged in pairs with regard to the elongate handle part and which are designed to interact with mating engagement elements in the course of the final installation and from the installation movement to create a clamping of the handle module by the door outer skin or a door structural element which is associated with the door outer skin.

In various embodiments, the fastening slide is formed as a dimensionally stable, especially rigid, component, such as in that the fastening slide is formed in one piece, further in that the fastening slide is formed from metal, especially sheet metal, or from plastic.

In various embodiments, the door handle unit is designed to be connected in a form-fitting manner, with a clearance, to the motor vehicle door for the pre-installation, such as in that the door handle unit is designed to be fitted in or on the motor vehicle door or hooked into the motor vehicle door for the pre-installation.

In various embodiments, provision is made for a feed device for creating the installation movement in the installation direction which, with the door handle unit pre-installed, can be operated from a narrow side of the motor vehicle door by means of a tool, such as in that the feed device has a screw element which is accessible from the narrow side of the motor vehicle door by means of a tool and which, with the door handle unit pre-installed, is connected to the motor vehicle door on one side and to the fastening slide on the other side in such a way that a screw movement of the screw element creates the installation movement, such as in that the installation direction extends along the door outer skin.

In various embodiments, the at least one engagement element together with the at least one mating engagement element provides a deflection mechanism which as a reaction to the installation movement introduces a feed movement into the fastening slide toward the door outer skin, and/or which as a reaction to the installation movement introduces a feed movement into the handle module toward the door outer skin.

In various embodiments, the at least one engagement element and the at least one mating engagement element interact with each other in the manner of a wedge gear for creating the feed movement.

In various embodiments, the at least one engagement element and the at least one mating engagement element sink into each other in pairs for the pre-installation and/or for the final installation.

In various embodiments, the handle module is supported from the door inner side on the door outer skin or a door structural element which is associated with the door outer skin, especially on an edge region of the handle recess of the door outer skin with a clamping force which is attributed to the clamping, such as in that the handle part is free from the clamping of the handle module.

In various embodiments, the at least one mating engagement element is arranged on a component, fastened to the door, especially on the door outer skin or on a door structural element which is associated with the door outer skin or on an installation module, so that the deflection mechanism introduces a feed movement in the fastening slide toward the door outer skin.

In various embodiments, the connecting of the fastening slide to the handle module is attributed to the fact that the fastening slide is formed by the handle module.

In various embodiments, the connecting of the fastening slide to the handle module is attributed to a longitudinal guiding of the handle module on the fastening slide which is oriented along the installation direction and in that the handle module is blocked in the installation direction.

In various embodiments, the fastening slide, with the door handle unit pre-installed, is longitudinally guided on the door outer skin or on a door structural element which is associated with the door outer skin, in that the at least one mating engagement element is arranged on the handle module and in that the handle module is blocked in the installation direction.

Various embodiments provide an installation module for a motor vehicle door with an installation module carrier on which are fastened at least two functional components, wherein the installation module can be installed together with the functional components in or on the motor vehicle door, wherein one of the functional components is designed as a door handle unit as described herein.

In various embodiments, the motor vehicle door has a wet-dry space partition which separates a wet space from a dry space, in that the pre-installation and the final installation of the door handle unit is provided in the wet space and in that the installation module in the finally installed state closes off an opening in the wet-dry space partition and/or forms the wet-dry space partition, such as in that the closing off of the opening in the wet-dry space partition or the forming of the wet-dry space partition is accompanied by the pre-installation of the door handle unit.

In various embodiments, the installation module carries a further installation module, and in that the further installation module has a further installation module carrier which carries a motor vehicle lock and the door handle unit.

Various embodiments provide a motor vehicle door with a door handle unit as described herein and/or with an installation module as described herein.

In various embodiments, the door handle unit is pre-installed on the motor vehicle door from the door inner side, and in that an installation movement is then introduced into the fastening slide and as a result the door handle unit is finally installed.

In various embodiments, the door handle unit is first of all fastened on an installation module before the door handle unit, fastened on the installation module, is pre-installed on the motor vehicle door together with the installation module.

In various embodiments, the motor vehicle door has a wet-dry space partition which separates a wet space from a dry space, in that the pre-installation and the final installation of the door handle unit takes place in the wet space and in that in the course of the pre-installation of the door handle unit an opening in the wet-dry space partition of the motor vehicle door is closed off by the installation module or the wet-dry space partition is formed by the installation module.

BRIEF DESCRIPTION OF THE DRAWINGS

In the following text, the disclosure is explained in more detail based a drawing which shows only exemplary embodiments. In the drawing FIG. 1 a) shows a perspective view of a motor vehicle door according to the proposal with a door handle unit according to the proposal and
  b) shows an exploded view in relation to a),
FIG. 2 a) shows a detailed, perspective view of the motor vehicle door according to FIG. 1a) from the outside with the door handle unit finally installed and
  b) shows an exploded view in relation to a),
FIG. 3 a) shows a detailed, perspective view of the motor vehicle door according to FIG. 1a) from the inside with the door handle unit pre-installed,
  b) shows a schematized sectional view along the line of intersection b-b with the door handle unit pre-installed and
  c) shows the sectional view according to b) with the door handle unit finally installed,
FIG. 4 a) shows a detailed, perspective view of the motor vehicle door according to FIG. 1a) from the inside with the door handle unit pre-installed according to a second exemplary embodiment,
  b) shows a schematized sectional view along the line of intersection b-b with the door handle unit pre-installed and
  c) shows the sectional view according to b) with the door handle unit finally installed,
FIG. 5 a) shows a detailed, perspective view of the motor vehicle door according to FIG. 1a) from the inside with the door handle unit pre-installed according to a third exemplary embodiment,
  b) shows a schematized sectional view along the line of intersection c-c before the pre-installation of the door handle unit,
  c) shows the sectional view according to b) with the door handle unit pre-installed,
  d) shows a schematized sectional view along the line of intersection d-d with the door handle unit pre-installed and
  e) shows the sectional view according to d) with the door handle unit finally installed.

DETAILED DESCRIPTION

The door handle unit 1 according to the proposal is associated with a motor vehicle door 2. The term "motor vehicle door" is to be widely understood in the present case. It includes side doors, rear doors, tailgates, boot lids or the like. The motor vehicle door, as shown in FIG. 1a), can be designed as pivoting wing door, which can be pivoted via a hinge arrangement 3, or as a movable sliding door.

Figure 1:
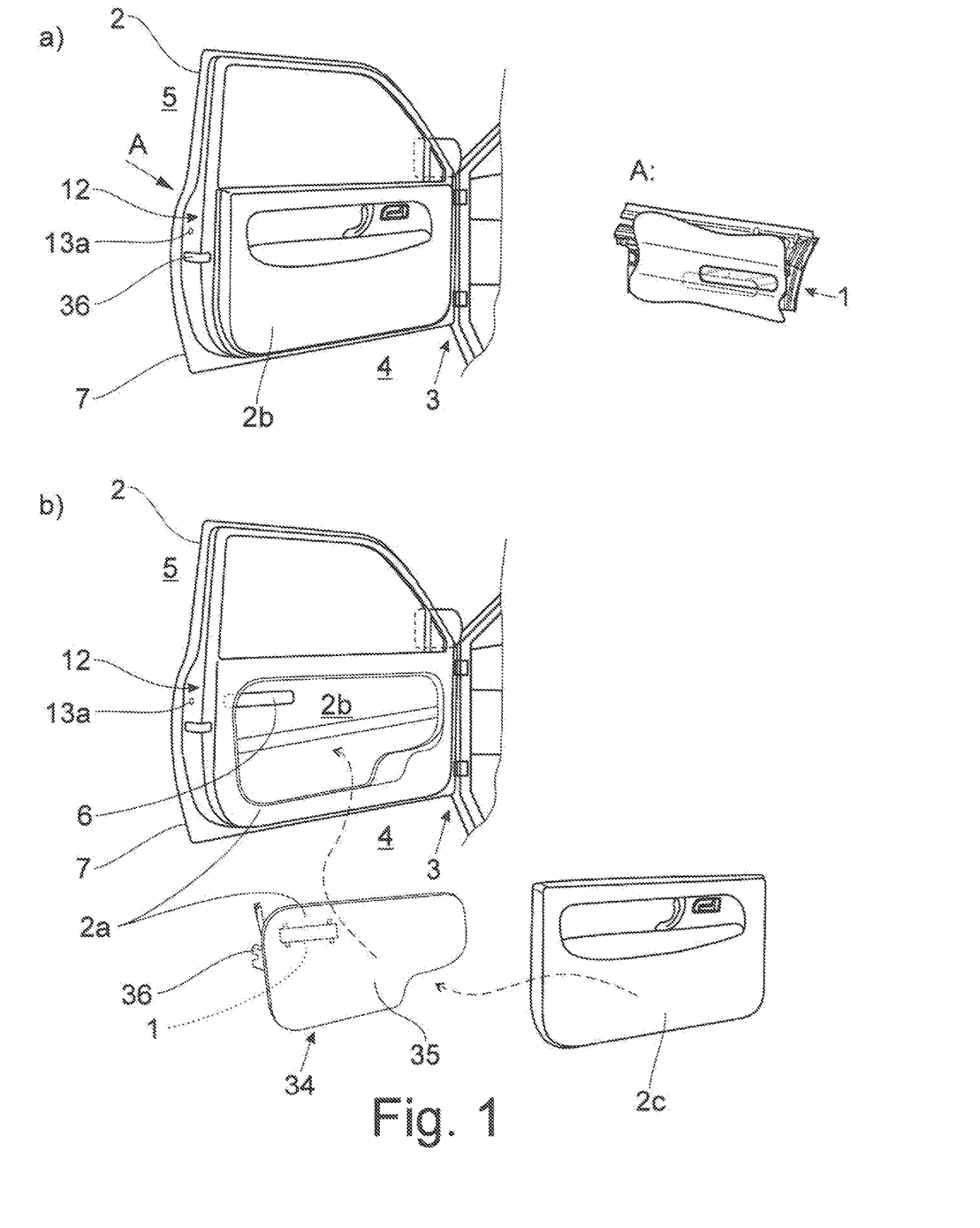
Figure 2:
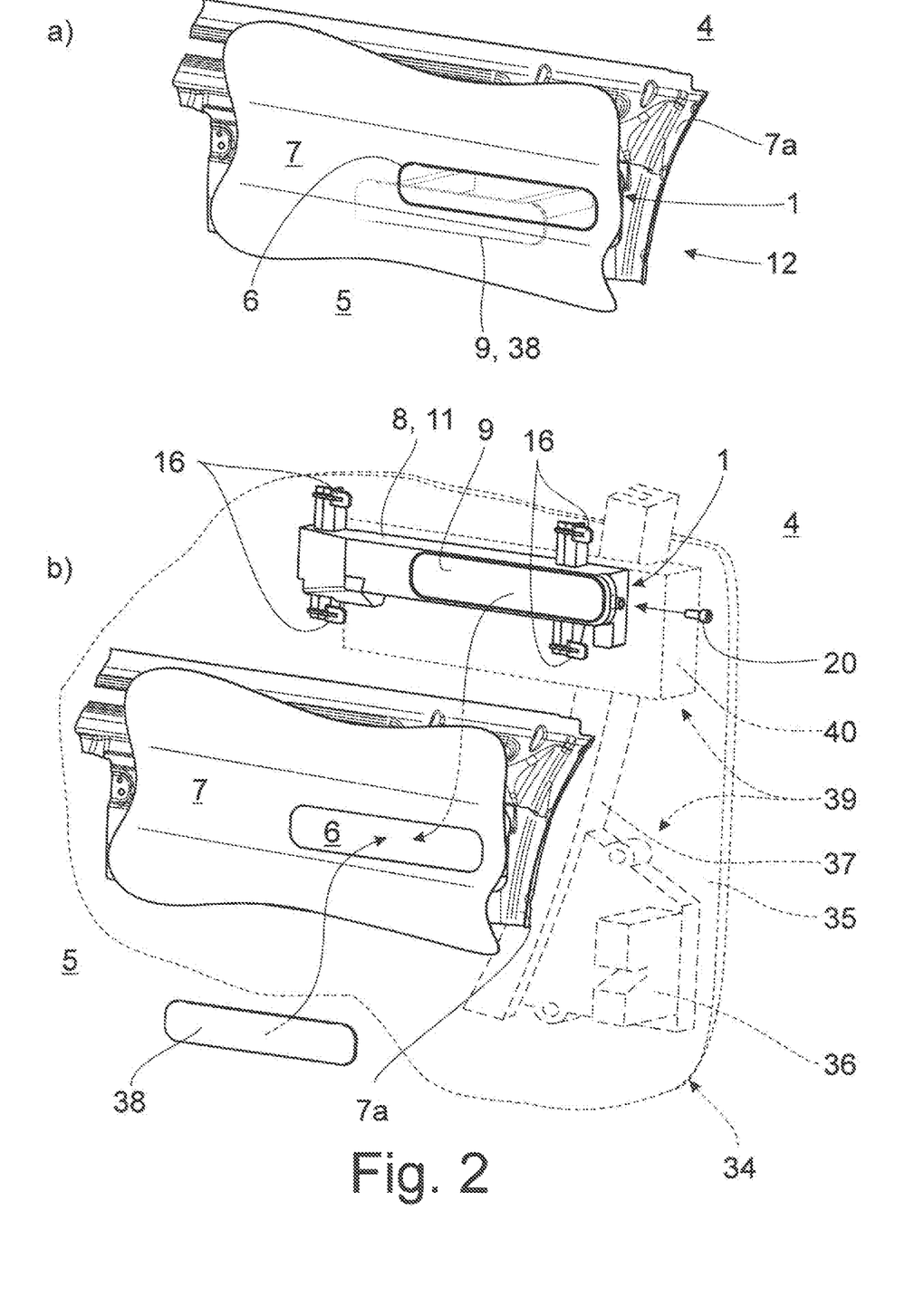
Figure 3:
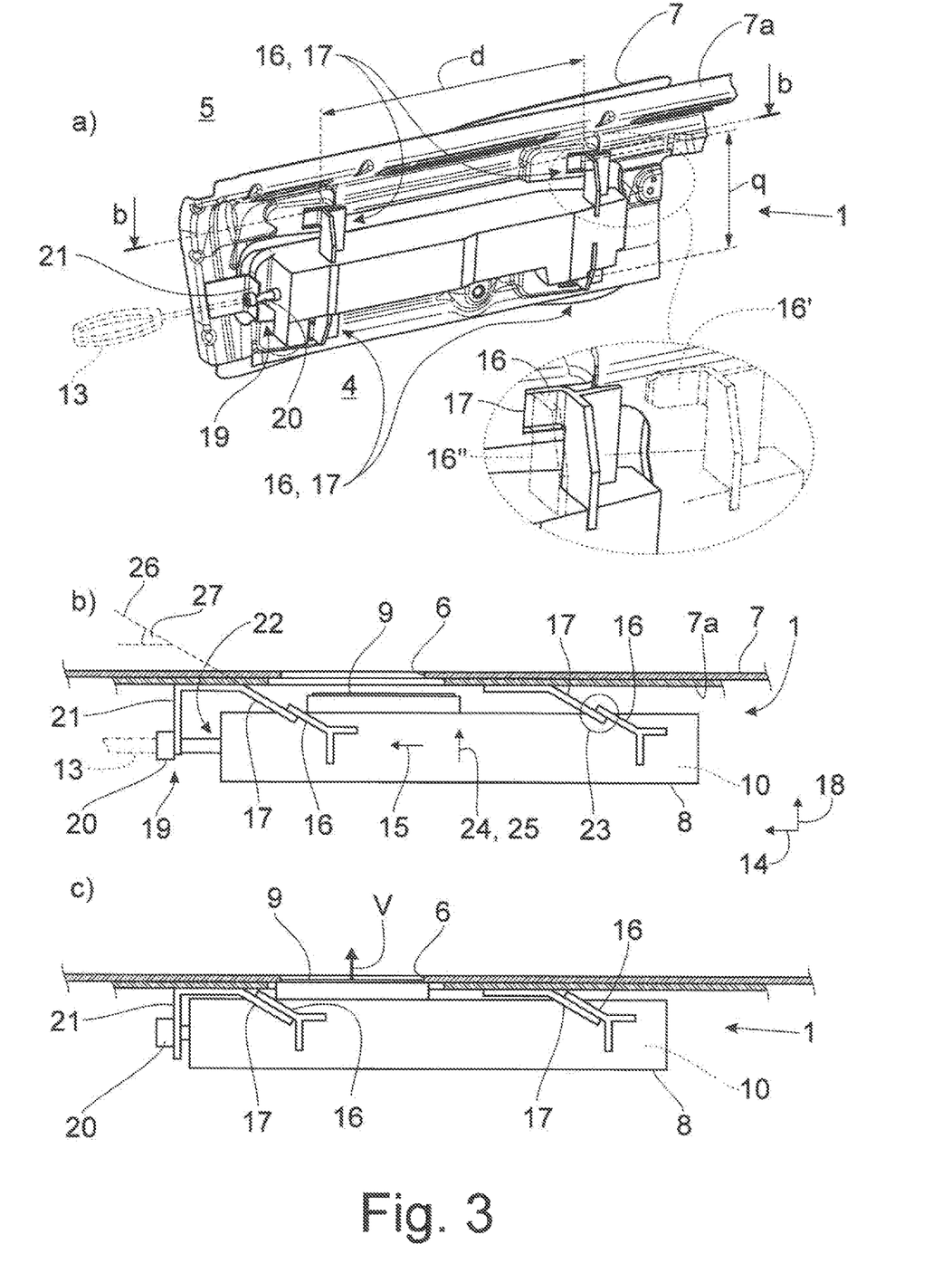
Figure 4:
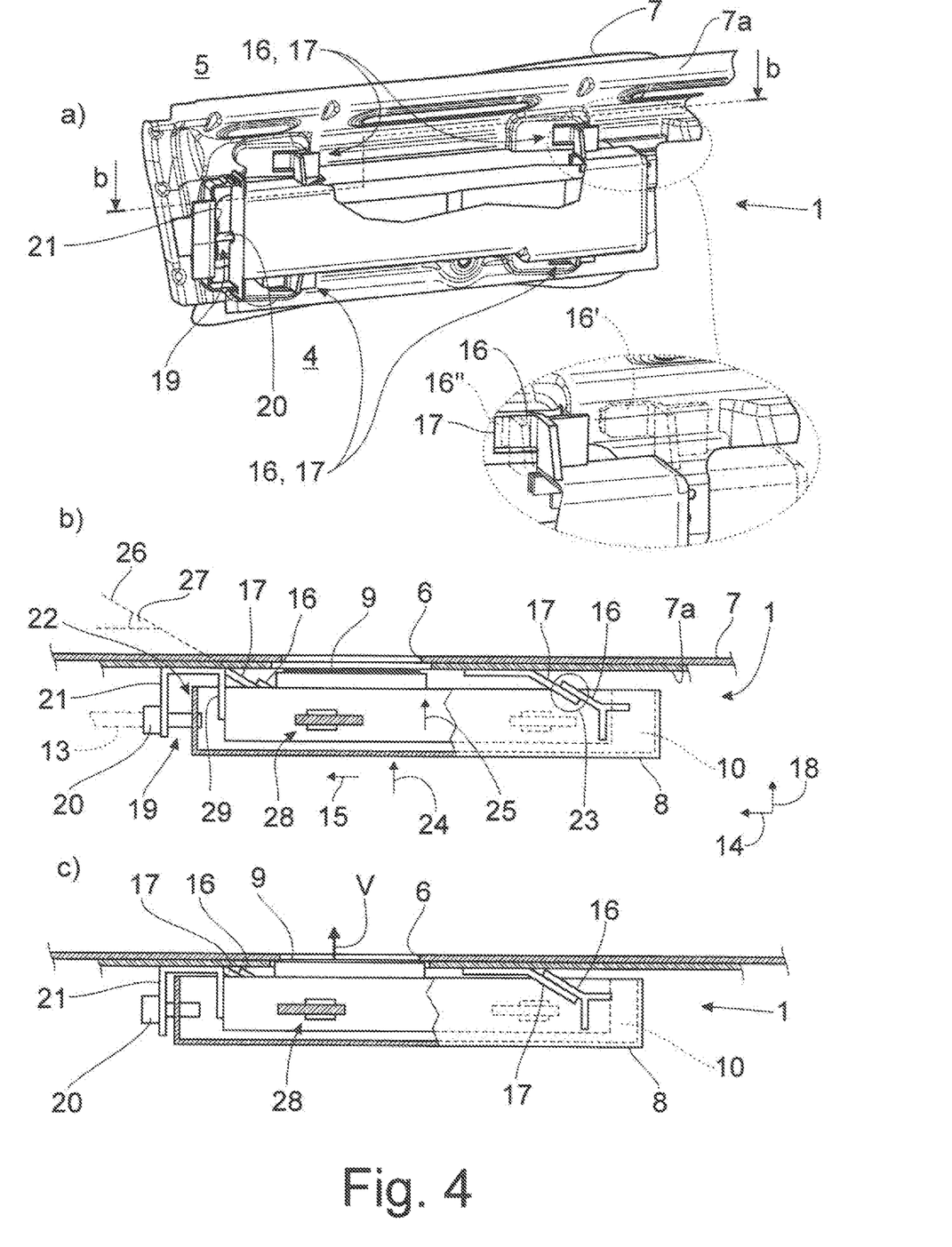
Figure 5:
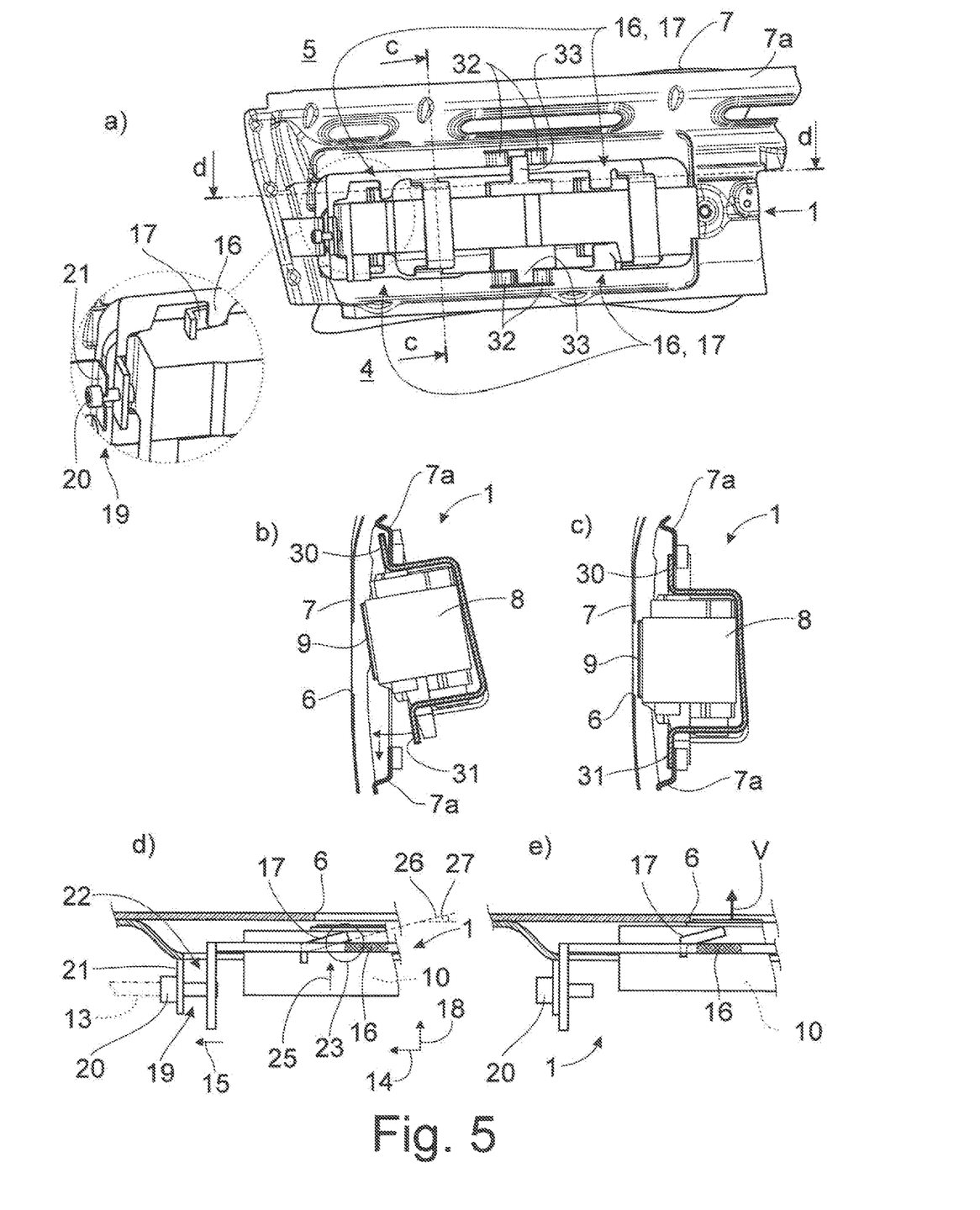

The solution according to the proposal is shown in altogether three exemplary embodiments in FIGS. 1 to 3, in FIG. 4 and in FIG. 5. The views in FIGS. 3a), 4a) and 5a)-c) show the respective exemplary embodiment in all constructional details, whereas the views in FIGS. 3b), 3c), and 4b), 4c) and 5d) have been schematized for simplification. Due to the fact that the exemplary embodiments are largely similarly structured, the figures show identical designations for functionally the same components. Accordingly, relevant explanations similarly apply to all the exemplary embodiments.

For installing the door handle unit 1 on the motor vehicle door 2, various advantageous variants are conceivable. Common to all the depicted variants is the fact that the door handle unit 1 is installed as such on a handle recess 6 of the door outer skin 7 of the motor vehicle door 2 from the door inner side 4 and not from the door outer side 5. In this case, as is to be gathered from the view according to FIG. 2a), an installation of the door handle unit 1 in a possibly flush or set back manner in relation to the door outer skin 7 is provided.

FIG. 2b) shows that the door handle unit 1 has a handle module 8 and, in this case, an elongate handle part 9, which is accommodated by the handle module 8. The handle module 8 has a mechanism 10, not shown in more detail, for the motorized adjustment of the handle part 9. The term "motorized" is to be widely understood in the present case. It includes any adjustment of the handle part 9 by means of an actuator of any type, especially an electric actuator.

By means of the mechanism 10, the handle part 9 can be adjusted, in this case, between a parking position, which is shown in FIG. 2a) by a continuous line, and an operating position, which is shown in FIG. 2a) by a dashed line. In the parking position, the handle part 9 is arranged in a flush or set back manner in relation to the door outer skin 7, whereas in the operating position the handle part 9 projects from the door outer skin 7 and therefore can be gripped by the hand of a user.

Meant by installation of the door handle unit 1 "as such" is that the door handle unit 1 can be installed as a sub-assembly, comprising the handle module 8 and the handle part 9, from the door inner side 4. It is essential in this case that this sub-assembly is installed from the door inner side 4.

As is to be seen for example in FIG. 3b) for the first exemplary embodiment, in 4b) for the second exemplary embodiment and in FIG. 5d) for the third exemplary embodiment, the door handle unit 1 can be pre-installed on the vehicle door 2. Meant by this is that the door handle unit 1 is pre-positioned and can be arranged in a self-retaining manner on the motor vehicle door 2.

It is now essential that the door handle unit 1 has a fastening slide 11 which with the door handle unit 1 pre-installed is connected on one side to the handle module 8 and on the other side to the motor vehicle door 2. This can also be best gathered from the views according to FIGS. 3b), 4b) and 5d).

In the views and in exemplary embodiments, only a single fastening slide 11 is allocated to the door handle unit 1. In principle, two or more fastening slides 11 can also be allocated to the door handle unit 1. All the embodiments which relate to the one fastening slide 11 correspondingly apply to further, possibly provided fastening slides.

It is also essential that for the final installation of the door handle unit 1 from a narrow side 12 of the motor vehicle door 2 by means a tool 13, in this case, a linear installation movement 15 can be introduced into the fastening slide 11 in an installation direction 14. In this case, provision is made on the motor vehicle door 2, in this case on the narrow side 12 of the vehicle door 2, for a tool opening 13a through which the tool 13 can be guided.

In the case of the narrow side 12, it can, in this case, be the narrow side of the motor vehicle door 2 which is opposite the hinge arrangement 3. The final installation results from the transition from FIG. 3b) to FIG. 3c) for the first exemplary embodiment, from the transition from FIG. 4b) to FIG. 4c) for the second exemplary embodiment and from the transition from FIG. 5d) to FIG. 5e) for the third exemplary embodiment. In the detailed views of FIGS. 3a) and 4a), the engagement element there is shown by the designation 16' in a situation which is prior to the pre-installation and by the designation 16" in the final installation situation, in each case by a dashed line.

In all three exemplary embodiments, the fastening slide 11 has at least one engagement element 16 which is designed to interact with a mating engagement element 17 in the course of the final installation and from the installation movement are to create a clamping of the handle module 8 by the door outer skin 7, wherein the clamping serves for the fastening of the handle module 8 on the motor vehicle door 2. The clamping can in principle also be provided between the handle module 8 and a door structural element 7a which is associated with the door outer skin 7. It can be gathered from the views according to FIGS. 3 to 5 that the resulting clamping force V is oriented transversely to the door outer skin 7, in this case also transversely to the installation direction 14.

In order to achieve a uniform clamping of the handle module 8 by the door outer skin 7, in all the exemplary embodiments provision is made for a plurality of, in this case four, previously exemplified engagement elements 16 with respectively allocated mating engagement elements 17.

Generally speaking, the fact is that the fastening slide 11 has at least two separate engagement elements 16 which are spaced apart with regard to the installation direction 14 and which are designed to interact with mating engagement elements 17 during the course of the final installation and from the installation movement are to create a clamping of the handle module 8 by the door outer skin 7 or a door structural element which is associated with the door outer skin 7. Such a spacing between two engagement elements 16 is indicated by way of example in FIG. 3a) by the designation "d".

It can be provided that the fastening slide 11 has at least two previously exemplified separate engagement elements 16 which with regard to a transverse direction 18 which is oriented transversely to the installation direction 14 are arranged in a spaced apart manner. Such a space between engagement elements 16 is indicated by way of example in FIG. 3a) by the designation "q".

In all the depicted, and in various embodiments, the fact is that the fastening slide 11 has four engagement elements 16 which are oppositely arranged in pairs with regard to the elongate handle part 9. In principle, however, provision can be made for more than four engagement elements 16 which are correspondingly oppositely arranged in pairs with regard to the elongate handle part 9.

A glance at the three exemplary embodiments further reveals that the fastening slide 11 is designed as a dimensionally stable, especially rigid, component. This means that the installation movement 15, as stated above, extends to all the engagement elements 16 without further constructional measures. A high degree of mechanical stability with low production cost can be achieved by the fastening slide 11, as shown in FIGS. 4 and 5, being designed in one piece. In this case, the fastening slide 11 is formed from metal, especially sheet metal, wherein a particularly simple adaptability to production is provided when the fastening slide 11 is a stamped-bent part. Alternatively, it can be provided, however, that the fastening slide 11 is formed from plastic, which enables production of the fastening slide 11 in a plastic injection molding process. This can be implemented in a flexible and inexpensive manner.

As stated above, the door handle unit 1 is pre-positioned, can be in a self-retaining manner, in the course of the pre-installation. This is realized, in this case, by the door handle unit 1 being designed to be connected to the motor vehicle door 2 in a form-fitting manner, with a clearance, for the pre-installation. In this case, the door handle unit 1 is designed to be fitted in or on the motor vehicle door 2, or hooked into the motor vehicle door 2, for the pre-installation. Both variants can be realized via the engagement elements 16 and mating engagement elements 17 or via the fastening slide 11. It is also conceivable, however, that the pre-installation is realized by means of separate retaining elements.

In the case of the depicted, and in exemplary embodiments, provision is made for a feed device 19 for creating the installation movement, which can be operated from the above-mentioned narrow side 12 of the motor vehicle door 2 by means of the also mentioned tool 13. In a variant which is particularly simple to realize and shown here, the feed device 19 has a screw element 20 which is accessible from the narrow side 12 of the motor vehicle door 2 by means of the tool 13 and which with the door handle unit 1 pre-installed is connected to the motor vehicle door 2 on one side and to the fastening slide 11 on the other side in such a way that a screw movement of the screw element 20 creates the installation movement 15. In this case, the fact is that the installation direction 14 extends along the door outer skin 7.

In detail, provision is made in the depicted exemplary embodiments for a support 21, fastened to the door, for the screw element 20, in which the screw element 20 can be rotated, but is axially fixed. In addition, the screw element 20 is in meshing engagement with a threaded element 22 arranged on the fastening slide 11 so that by a screw movement of the screw element 20 the fastening slide 11 is drawn toward the support 21. In all three exemplary embodiments, the support 21 is not fastened directly on the door outer skin 7 but on a structural element 7a which is associated with the door outer skin 7.

Again, in all three depicted embodiments the fact is that the engagement elements 16 together with the mating engagement elements 17 provide in each case a deflection mechanism 23 which as a reaction to the installation movement 15 creates a feed movement 24, 25. In the exemplary embodiments shown in FIGS. 3 and 4, the feed movement 24 there is introduced both into the fastening slide 11 and into the handle module 8. In the case of the exemplary embodiment shown in FIG. 5 on the other hand, the feed movement 25 there is introduced exclusively into the handle module 8, whereas the fastening slide 11 moves exclusively in the installation direction 14.

As shown in FIGS. 3, 4 and 5, an interaction between the engagement elements 16 and the mating engagement elements 17 is provided in the manner of a wedge gear for creating the respective feed movement 24, 25. This entails the common tangential plane 26 between engagement element 16 and mating engagement element 17 being set at an incidence angle 27 in relation to the installation direction 14.

In the present case, the interaction between the engagement elements 16 and the mating engagement elements 17 has a double meaning. On the one hand, it can be provided in the depicted, and exemplary embodiments that the pre-installation of the door handle unit 1 on the motor vehicle door 2 is attributed to the interaction between the engagement elements 16 and the mating engagement elements 17. On the other hand, this interaction between the engagement elements 16 and the mating engagement elements 17 is to create an above-mentioned deflection mechanism 23. Both functions can be realized in a particularly simple manner by the engagement elements 16 and the associated mating engagement elements 17 sinking into each other in pairs both for the pre-installation and for the final installation, that is to say during the installation movement 15 which is introduced into the fastening slide 11. To this end, the engagement elements 16 can be designed as retaining tabs and the mating engagement elements 17 can be designed as retaining pockets, wherein the retaining tabs sink in the retaining pockets. This can also be provided in reverse.

It can also be gathered from the views according to FIGS. 3 and 4 that the mating engagement elements 17 can in each case be arranged on a component fastened to the door, especially on the door outer skin 7 or, as in the case, on a door structural element 7a which is associated with the door outer skin 7, so that the deflection mechanism 23 introduces a feed movement 24 into the fastening slide 11 toward the door outer skin 7. The transition from FIG. 3b) to FIG. 3c) for the first exemplary embodiment and from FIG. 4b) to FIG. 4c) for the second exemplary embodiment shows this.

Owing to the fact that in the case of the exemplary embodiment shown in FIG. 3 the connecting of the fastening slide 11 to the handle module 8 is attributed to the fastening slide 11 being formed by the handle module 8, the feed movement 24 on the fastening slide 11 corresponds to the feed movement 25 on the handle module 8. Both the fastening slide 11 and the handle module 8 execute a movement which in addition to the movement portion in the installation direction 14 also has a movement portion in the feed direction.

It is different in the case of the second exemplary embodiment shown in FIG. 4. In this case, the fact is that the connecting of the fastening slide 11 to the handle module 8 is attributed to a longitudinal guiding of the handle module 8 on the fastening slide 11 which is oriented along the installation direction 14. The longitudinal guiding, in this case, is realized by means of a longitudinal guide unit 28 which is only indicated in FIG. 4. Owing to the fact that, in this case, the handle module 8 is blocked in the installation direction 14 by means of the blocking element 29, the handle module 8 can only follow the feed movement 24 of the fastening slide 11 so that the feed movement 25 of the handle module 8, as mentioned above, corresponds to the feed movement 24 of the fastening slide 11. The transition from FIG. 4b) to FIG. 4c) particularly clearly shows that the feed movement 25 of the handle module 8 has no movement portion in the installation direction 14, which can be advantageous especially for the force application of a seal which is possibly interposed between the handle module 8 and the motor vehicle door 2.

Whereas in the case of the third exemplary embodiment shown in FIG. 5 a deflection mechanism 23 is also realized in the above sense, the specific engagement there of the fastening slide 11 with the vehicle door 2 leads to a different way of functioning. According to this, the fastening slide 11, with the door handle unit 1 pre-installed, is longitudinally guided along a door structural element 7a which is associated with the door outer skin 7 so that a longitudinal guiding along the door outer skin 7 results. The movability of the fastening slide 11 along the door structural element 7a is provided from an overview of FIG. 5d) and FIG. 5e).

The longitudinal guiding of the fastening slide 11 on the door structural element 7a, in the case of the third exemplary embodiment, as shown in FIG. 5c), results from the fact that the fastening slide 11 in cross section, as seen transversely to the installation direction 14, has two legs 30, 31 which fit behind the door structural element 7a which, in this case, extends parallel to the door outer skin 7. The longitudinal guiding, as results from the transition from FIG. 5b) to FIG. 5c), can be created by a hooking of the fastening slide 11 into the door structural element 7a. Owing to the fact that the upper leg 30 in FIG. 5b) is of a longer design than the lower leg 31, the hooking in can be implemented in a simple manner by a pivoting and sliding movement which is indicated in FIG. 5b). This hooking of the fastening slide 11 into the door structural element 7a at the same time corresponds to the above-mentioned pre-installation of the door handle unit 1 on the vehicle door 2.

It is essential in the case of the exemplary embodiment shown in FIG. 5 that the mating engagement elements 17 are arranged on the handle module 8. Owing to the fact that the handle module 8, as is still to be explained, is blocked in the installation direction 14, the handle module 8 cannot follow the movement of the fastening slide 11 in the installation direction 14 so that the feed movement 25 is exclusively introduced into the handle module 8 via the deflection mechanism 23. It is also advantageous in this case with regard to possibly interposed seals that the handle module 8 is moved transversely to the door outer skin 7 as a result.

For the above blocking of the handle module 8 in the installation direction 14 provision is made for a blocking arrangement 32, fastened to the door, which interacts with a blocking element 33 which is arranged on the handle module 8.

It may be concluded that by means of the solution according to the proposal a fastening of the handle module 8 on the motor vehicle door 2 from the door inner side 4 is achieved without a fastening having to be carried out from the door outer side 5. A fastening of the handle module 8 from the door outer side 5 is therefore, in some embodiments not provided, which leads to a particularly high degree of freedom in the styling of the handle module 8.

According to a further teaching, an installation module 34 for a motor vehicle door 2 with an installation module carrier 35, on which are fastened at least two functional components, is described as such.

Generally speaking, the installation module 34 has an installation module carrier 35 on which are fastened at least two functional components. The term "fastened" is to be widely construed and includes both a rigid connection and also a loose connection. The installation module 34 can be mounted in or on the motor vehicle door 2 together with the functional components, which enables a simplified installation process, but also the testability of the functional components, which are fastened on the installation module 34, separately from the vehicle door 2.

According to the further teaching, one of the functional components of the installation module 34 is designed as the door handle unit 1 according to the proposal. In this respect, reference may be made to the above embodiments in relation to the door handle unit 1 according to the proposal.

An above installation module 34 is indicated in FIGS. 1b) and 2b). Arranged on the installation module carrier 35 are a motor vehicle lock 36, a window guide rail 37 and also a door handle unit 1 according to the proposal. Other functional components, such as a window lifter, a loudspeaker arrangement or the like, which are connected to the installation module 34, are conceivable. The installation module 34 is fitted as such in or on the motor vehicle door 2 from the door inner side 4. All the above-mentioned components can therefore be handled by the installation module 34, especially by the installation module carrier 35, in the course of the installation together with the installation module carrier 35.

In this case, the motor vehicle door 2 has a wet-dry space partition 2a which separates the wet space from a dry space. The wet space can be formed by a cavity in the motor vehicle door 2, in which can be located the door handle unit 1 in its finally installed state. In the case of the exemplary embodiment depicted, in FIG. 1, the dry space is closed off by means of an interior door trim panel 2c.

FIG. 1b) shows that the installation module 34 in the finally installed state closes off an opening 2b in the wet-dry space partition 2a which is formed in the door inner panel. Alternatively, it can be provided that the wet-dry space partition 2a is formed by the installation module 34 alone. In some embodiments, it is such that the closing off of the opening 2b in the wet-dry space partition 2a or the production of the wet-dry space partition 2a is accompanied by the pre-installation of the door handle unit 1.

FIG. 2 shows that, in this case, the installation module 34 carries a further installation module 39 which has a further installation module carrier 40 which carries the motor vehicle lock 36 and the door handle unit 1.

In the case of the installation module 34, which closes off the opening 2b, it is a so-called door module, whereas in the case of the further installation module 39 it is a so-called lock module. The lock module, in some embodiments, carries the motor vehicle lock 36 and possibly the door handle unit 1. Such a lock module can basically be provided, as in this case, with a door module connection, or can even be used as such without a door module. In this respect, there is almost no limit set to the flexible design of the vehicle door 2.

According to a further teaching, a motor vehicle door 2 with a door handle unit 1 according to the proposal and/or with an installation module 34 according to the proposal is described as such.

In some embodiments, the external shape of the handle part 9, especially in its parking position corresponds to the shape of the handle recess 6 of the door outer skin 7, apart from a gap, wherein the width of the gap can be less than 5 mm, or less than 2 mm.

Reference may be made to the fact that the above-mentioned flush arrangement of the handle part 9 on the door outer skin 7 can be provided subject to a thin blanking panel 38 which can subsequently be fitted on the handle part 9 from the door outer side 5. This retrospective fastening of the blanking panel 38 on the handle part 9 is advantage insofar as it is consequently possible to provide installation moldings, especially installation openings, on the handle part 9, via which the handle part 9 can be guided from the door outer side 5 in the course of the pre-installation of the door handle unit 1. This for example simplifies the above-mentioned threading of the engagement elements 16 into the associated mating engagement elements 17.

According to a further teaching the method for installing a door handle unit 1 according to the proposal on a motor vehicle door is described as such.

According to the method according to the proposal, it is essential that the door handle unit 1 is pre-installed on the motor vehicle door 2 from the door inner side 4 and then finally installed by introducing the installation movement into the fastening slide 11. In detail, it can be such that in the course of the pre-installation of the door handle unit 1 on the motor vehicle door 2 the engagement elements 16 are brought into engagement with the mating engagement elements 17. For the final installation of the door handle unit 1, an installation movement 15 is then introduced into the fastening slide 11 in an installation direction 14 from a narrow side 12 of the motor vehicle door 2 by means of a tool 13. Furthermore, it is possible in such way that the engagement elements 16 are designed to interact with mating engagement elements 17 in the course of the final installation and from the installation movement to create a clamping of the handle module 8 by the door outer skin 7 or a door structural element 7a which is associated with the door outer skin 7. Reference may be made to all the above embodiments which are suitable for explaining the method according to the proposal.

When using an above installation module 34 it can be provided that the door handle unit 1 is first of all fastened on the installation module 34, especially on a door module or on a lock module, before the door handle unit 1, fastened on the installation module 34, is pre-installed on the motor vehicle door 2 together with the installation module 34.

Furthermore, the fact can be that the motor vehicle door 2 has an above-mentioned wet-dry space partition 2a which separates a wet space from a dry space, that the pre-installation and the final installation of the door handle unit 1 takes place in the wet space and that in the course of the pre-installation of the door handle unit 1 an opening 2b in the wet-dry space partition 2a of the motor vehicle door 2 is closed off by the installation module 34 and/or the wet-dry space partition is formed by the installation module 34. Reference may be made to all the above relevant embodiments.

The invention claimed is:

1. A door handle unit for a motor vehicle door which can be installed from the door inner side on a handle recess of the door outer skin of the motor vehicle door, in a flush or set back manner in relation to the door outer skin, wherein the door handle unit has a handle module and an elongate handle part which is accommodated by the handle module, wherein the handle module has a mechanism for the motorized adjustment of the handle part, wherein the door handle unit can be pre-installed on the motor vehicle door, wherein, the door handle unit has a fastening slide which, with the door handle unit pre-installed, is connected to the handle module on one side and to the motor vehicle door on the other side, for a final installation of the door handle unit an installation movement is introduced into the fastening slide by a tool in an installation direction from a narrow side of the motor vehicle door, in that the fastening slide has at least one engagement element which is designed to interact with a mating engagement element in the final installation and from the installation movement to create a clamping of the handle module by the door outer skin or a door structural element which is associated with the door outer skin.

2. The door handle unit as claimed in claim 1, wherein the at least one engagement element of the fastening slide has at least two separate engagement elements which are spaced apart with regard to the installation direction and which are designed to interact with at least the mating engagement element and a second mating engagement element in the final installation and from the installation movement to create the clamping of the handle module by the door outer skin or the door structural element which is associated with the door outer skin.

3. The door handle unit as claimed in claim 2, wherein the at least one engagement element of the fastening slide has at least two separate engagement elements which are spaced apart with regard to a transverse direction which is oriented transversely to the installation direction and which are designed to interact with at least the mating engagement element and a second mating engagement element in the final installation and from the installation movement to create the clamping of the handle module by the door outer skin or the door structural element which is associated with the door outer skin, wherein the at least two engagement elements of the fastening slide has at least four engagement elements which are oppositely arranged in pairs with regard to the elongate handle part and which are designed to interact with at least the mating engagement element and the second mating engagement element in the final installation and from the installation movement to create the clamping of the handle module by the door outer skin or the door structural element which is associated with the door outer skin.

4. The door handle unit as claimed in claim 1, wherein the fastening slide is formed as a dimensionally stable, rigid, component.

5. The door handle unit as claimed in claim 1, wherein the door handle unit is designed to be connected in a form-fitting manner, with a clearance, to the motor vehicle door for the pre-installation.

6. The door handle unit as claimed in claim 1, wherein a feed device for creating the installation movement in the installation direction which, with the door handle unit pre-installed, can be operated from the narrow side of the motor vehicle door by the tool, wherein the feed device has a screw element which is accessible from the narrow side of the motor vehicle door by the tool and which, with the door handle unit pre-installed, is connected to the motor vehicle door on one side and to the fastening slide on the other side such that a screw movement of the screw element creates the installation movement.

7. The door handle unit as claimed in claim 1, wherein the at least one engagement element together with the mating engagement element provides a deflection mechanism which as a reaction to the installation movement introduces a feed movement into the fastening slide toward the door outer skin, and/or which as a reaction to the installation movement introduces a feed movement into the handle module toward the door outer skin.

8. The door handle unit as claimed in claim 7, wherein the at least one engagement element and the at least one mating engagement element interact with each other in the manner of a wedge gear for creating the feed movement.

9. The door handle unit as claimed in claim 7, wherein the mating engagement element is arranged on a component, fastened to the door, on the door outer skin or on the door structural element which is associated with the door outer skin or on an installation module, so that the deflection mechanism introduces the feed movement in the fastening slide toward the door outer skin.

10. An installation module comprising the door handle unit for the motor vehicle door as claimed in claim 9, with an installation module carrier on which are fastened at least two functional components, wherein the installation module can be installed together with the functional components in or on the motor vehicle door, wherein one of the functional components is designed as the door handle unit.

11. The installation module as claimed in claim 10, wherein the motor vehicle door has a wet-dry space partition which separates a wet space from a dry space, the pre-installation and the final installation of the door handle unit is provided in the wet space and the installation module in the final installation closes off an opening in the wet-dry space partition and/or forms the wet-dry space partition.

12. The installation module as claimed in claim 10, wherein the installation module carries a further installation module, and in that the further installation module has a further installation module carrier which carries a motor vehicle lock and the door handle unit.

13. The door handle unit as claimed in claim 7, wherein the fastening slide, with the door handle unit pre-installed, is longitudinally guided on the door outer skin or on the door structural element which is associated with the door outer skin, the mating engagement element is arranged on the handle module and the handle module is blocked in the installation direction.

14. The door handle unit as claimed in claim 1, wherein the at least one engagement element and the mating engagement element sink into each other in at least one pair for the pre-installation and/or for the final installation.

15. The door handle unit as claimed in claim 1, wherein the handle module is supported from the door inner side on the door outer skin or the door structural element which is associated with the door outer skin, on an edge region of the handle recess of the door outer skin with a clamping force which is attributed to the clamping.

16. The door handle unit as claimed in claim 1, wherein the connecting of the fastening slide to the handle module is attributed to the fastening slide being formed by the handle module.

17. The door handle unit as claimed in claim 1, wherein connecting of the fastening slide to the handle module is attributed to a longitudinal guiding of the handle module on the fastening slide which is oriented along the installation direction and the handle module is blocked in the installation direction.

18. A method for installing the door handle unit for the motor vehicle door as claimed in claim 1, wherein the door handle unit is pre-installed on the motor vehicle door from the door inner side, and the installation movement is then introduced into the fastening slide and as a result the door handle unit arrives in the final installation.

19. The method as claimed in claim 18, wherein the door handle unit is first of all fastened on an installation module before the door handle unit, fastened on the installation module, is pre-installed on the motor vehicle door together with the installation module.

20. The method as claimed in claim 19, wherein the motor vehicle door has a wet-dry space partition which separates a wet space from a dry space, the pre-installation and the final installation of the door handle unit takes place in the wet space and in the pre-installation of the door handle unit an opening in the wet-dry space partition of the motor vehicle door is closed off by the installation module or the wet-dry space partition is formed by the installation module.

* * * * *